United States Patent [19]

Armond et al.

[11] 4,168,149

[45] Sep. 18, 1979

[54] GAS SEPARATION

[75] Inventors: John W. Armond, Buckhurst Hill; Devasihamani J. G. Sebastian, Hoddesdon, both of England

[73] Assignee: BOC Limited, London, England

[21] Appl. No.: 862,593

[22] Filed: Dec. 20, 1977

[30] Foreign Application Priority Data

Dec. 23, 1976 [GB] United Kingdom ............... 53713/76

[51] Int. Cl.$^2$ ............................................. B01D 53/02
[52] U.S. Cl. ........................................... 55/21; 55/25; 55/58; 55/75; 55/163; 55/179; 55/389
[58] Field of Search .................. 55/21, 25, 26, 33, 58, 55/62, 75, 163, 179, 387, 389

[56] References Cited

U.S. PATENT DOCUMENTS

| 3,182,435 | 5/1965 | Axt | 55/163 X |
|---|---|---|---|
| 3,205,639 | 9/1965 | Johnson et al. | 55/163 X |
| 3,867,111 | 2/1975 | Knowles | 55/58 X |
| 3,891,411 | 6/1975 | Meyer | 55/58 X |
| 3,923,477 | 12/1975 | Armond et al. | 55/58 X |
| 4,013,429 | 3/1977 | Sircar et al. | 55/58 X |
| 4,065,272 | 12/1977 | Armond | 55/58 X |

*Primary Examiner*—Robert H. Spitzer
*Attorney, Agent, or Firm*—Dennison, Dennison, Meserole & Pollack

[57] ABSTRACT

A process and apparatus for separating gaseous mixtures by a pressure swing adsorption technique. One or more adsorbent beds are employed which operate on a cycle comprising the successive steps of adsorption, vacuum regeneration, and backfilling. The pressure in the bed(s) during backfilling is sensed, backfilling is ceased when such pressure reaches a predetermined level, and the regeneration step is controlled to occupy a constant period of time. The described process is able to maintain a substantially constant output flow and product purity despite the changes in adsorption capacity of the bed(s) which occur under fluctuating ambient temperatures.

9 Claims, 2 Drawing Figures

GAS SEPARATION

FIELD OF THE INVENTION

This invention relates to the separation of gaseous mixtures, and, more particularly, to such separation using a material which adsorbs more readily one or more components of the mixture than another or other components of the mixture, in a so-called pressure swing adsorption process.

BACKGROUND AND SUMMARY OF THE INVENTION

In a normal working environment, pressure swing adsorption (PSA) plants are often subjected to a fluctuating ambient temperature. In operation, the adsorbent bed temperature follows the fluctuating ambient temperature, usually with a time lag. However as the temperature of the bed alters its adsorption capacity also alters. When the temperature falls, the adsorption capacity of a bed increases so that it can effect purification of a greater quantity of gaseous mixture before it is saturated and requires regeneration. Consequently, a greater quantity of gas has to be removed from the bed during the vacuum regeneration step of the PSA cycle in order to reach a given level of vacuum and this occupies a longer evacuation time when using a vacuum pump of a given capacity, as compared to operation at the higher ambient temperature. On the other hand, when the ambient temperature increases the adsorption capacity of a bed reduces and a smaller quantity of gas is therefore retained in the bed when it is saturated. Consequently, a shorter evacuation time is required in order to reach the aforesaid given level of vacuum.

One way of controlling such a plant to operate under fluctuating temperature conditions would be to sense the level of vacuum in a bed being regenerated and to use a signal derived therefore to switch the process to the next stage of the cycle when a predetermined level of vacuum, e.g. 150 torr, is reached. As the bed temperature falls, more gas has to be evacuated to reach the predetermined level of vacuum and the cycle time is consequently longer, and, conversely, as the bed temperature rises, less gas has to be evacuated so that the cycle time is shorter. However, we have found that, when the temperature rises, the separating effect of the adsorbent material reduces so that the purity of the product gas is reduced. Therefore, this method of control does not give a constant flow and purity of product gas under varying temperature conditions.

The invention resides in a process for increasing the proportion of a selected gas in a gaseous mixture, the process comprising: repeating a cycle of operation which includes the successive steps of contacting the mixture with a bed of adsorbent material which preferentially adsorbs one more other components of the mixture, regenerating the bed by applying a vacuum thereto, and allowing product quality gas to pass into the bed from the outlet end thereof (referred to herein as 'backfilling'); wherein the pressure in the bed during backfilling is sensed, backfilling is ceased when such pressure reaches a predetermined level, and regneration of the bed is controlled to occupy a substantially constant period of time.

The invention also resides in apparatus adapted to perform a process as above-defined.

An advantage of a process according to the invention is that the output flow and purity of the product gas can be maintained substantially constant, over a range of ambient temperatures.

For example, when the temperature falls the bed adsorbs more gas so that there is potentially an increased quantity of gas to be removed during evacuation. As the time for regeneration is held constant the vacuum reached is softer, e.g. 200 torr as against 150 torr at normal ambient temperature, with the result that the separation process becomes less efficient and the yield of the required purity product expressed as a percentage of the feed gas processed is reduced. However, when a bed is evacuated by a vacuum pump connected to the bed outlet such pump passes more gas, measured under standard conditions, because it is not reaching so hard a vacuum and its hourly throughput, measured at STP, is greater. Thus overall more feed is processed at the lower temperature but a smaller percentage yield of product is obtained. It has been found that, in practice, the yield and feed volume of gaseous mixture processed are so related that the output flow and purity of product gas can remain substantially constant over a range of ambient temperatures.

Another factor governing successful operation of a PSA plant, in which the product gas is the less readily adsorbed component(s), is the use of a backfilling step. This step takes place between the vacuum regeneration step and the next subsequent adsorption step and comprises introducing product quality gas into the evacuated bed from the outlet thereof. The purpose of this step is to raise the pressure of the bed up to a value somewhere in the region of the adsorption pressure so as to provide a buffer between inlet and outlet against the more readily adsorbable components of the gaseous mixture at the start of the next adsorption step, thereby preventing the direct access of such components to the outlet end of the bed. It may also in some cases establish cycle conditions which allow the initial layers of the bed to act as a heatless dryer. There is usually an optimum value for the final backfill pressure which is normally determined empirically and which gives the maximum yield of product gas at the required purity. This value is often of the order of $\frac{2}{3}$ to $\frac{1}{4}$ of the absolute adsorption pressure. A further advantage of backfilling is that any residual adsorbed components on the bed are driven away from the region of the bed outlet.

Because the capacity of an adsorption bed alters with temperature then the pressure to which a bed will backfill through a fixed restriction in a set time also alters with temperature. In a process according to the invention, however, the time for backfilling of a bed is allowed to alter with temperature so that the optimum pressure after backfilling is reached irrespective of temperature variations. In an apparatus according to the invention, a pressure sensor, such as a pressure switch or pressure transducer is provided in the or each bed. Such device preferably provides a signal which operates a control system to close valve means controlling backfilling of the associated bed when the optimum pressure is reached in the bed.

A process according to the invention may be carried out in a multibed adsorption apparatus which preferably is controlled to produce a substantially continuous supply of product gas. A two bed apparatus may operate on a cycle for each bed which comprises an adsorption step, (i.e. a gas mixture admission step), a vacuum regeneration step, and a backfilling step, the cycles for the beds being sequenced to be 180° out of phase with one another. The time taken by the adsorption step may conveniently equal the time available for the sum of the regeneration and backfilling steps.

A three bed apparatus may operate on a cycle for each bed which is similar to that for the two bed apparatus, the cycles for the beds being sequenced to be 120° out of phase with one another. However, an advantage of a three bed apparatus is that the adsorption step can be a compound step which comprises in addition to the feed of the primary gas mixture a feed of gas mixture already partially enriched with the selected product gas which is taken from one of the other beds towards the end of the adsorption step therein (termed herein 'second cut gas') and which is fed into the first bed before admission of the primary gas mixture. This has the effect of improving the product yield of the process. The time taken by the primary gas mixture admission part of the adsorption step may conveniently equal the time taken by the regeneration step and the time available for the sum of the backfilling step and the second cut gas admission part of the adsorption step.

In any event, the time available for the backfilling step must clearly be sufficient to allow backfilling to take place over the expected range of ambient temperatures. Conveniently both the time of the overall cycle and the time of the regeneration step remain constant so that when the time taken to backfill is less than the total time available for that step (i.e. when the prevailing temperature is higher than the minimum temperature for which the process is 'self-regulating') there may be a rest period in the cycle before the next adsorption step commences. If desired, however, it would be possible to control the overall cycle time to alter with temperature so as to reduce or eliminate any such rest periods.

BRIEF DESCRIPTION OF THE DRAWINGS

A preferred embodiment of the invention will now be described, by way of example, with reference to the accompanying drawings, in which.

DESCRIPTION OF THE PREFERRED EMBODIMENT

Figure 1:
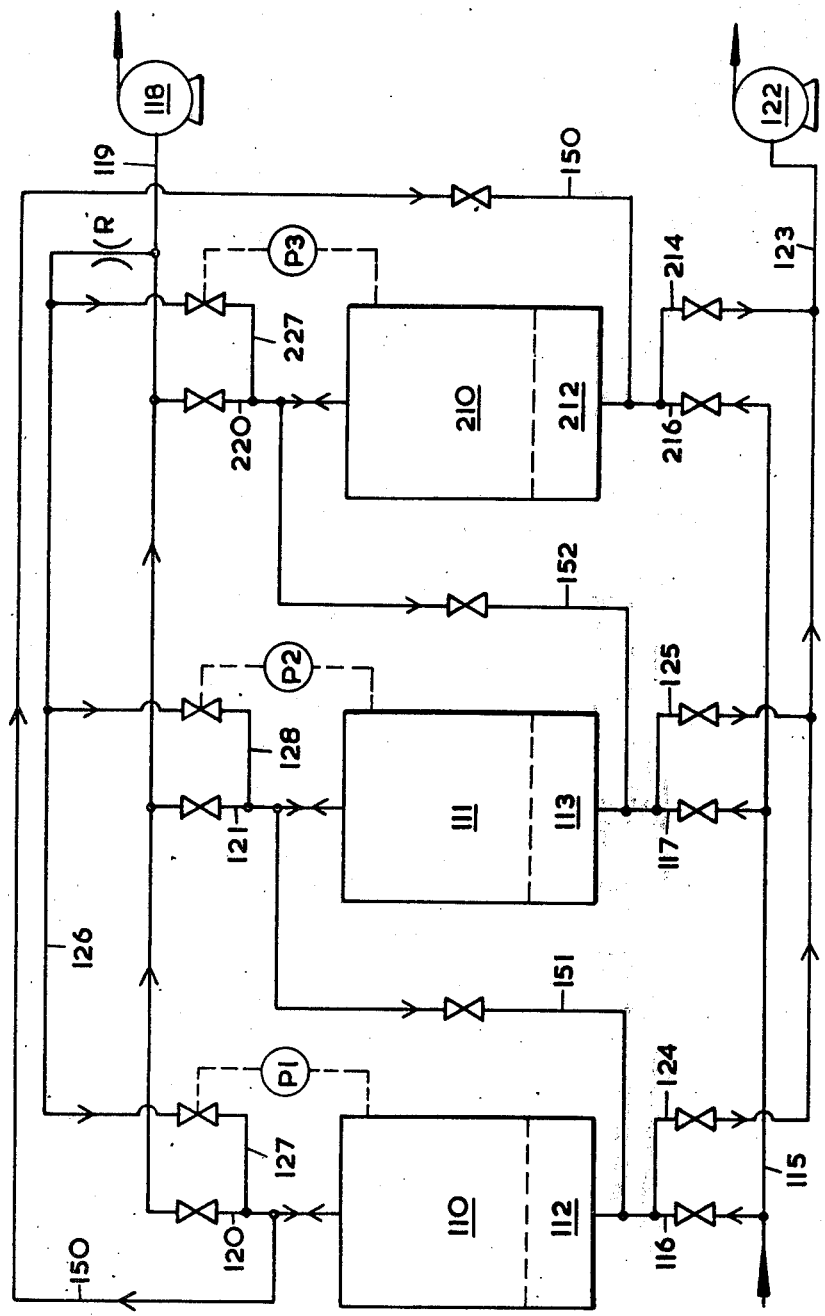
FIG. 1 is a diagrammatic representation of a three bed PSA plant for deriving any oxygen rich product gas from an air feedstock.

Referring to FIG. 1, the illustrated plant comprises three beds 110, 111 and 210 packed with an adsorbent material which is selective for nitrogen, for example a zeolite molecular sieve, preferably type 5A. Drying sections 112, 113 and 212 are provided at the inlet ends of the beds and may contain, for example, silica gel, activated alumina, silica alumina or 5A or another zeolite molecular sieve.

Air is fed to the adsorbent beds through a line 115 and respective valved lines 116, 117 and 216. The oxygen rich product gas is withdrawn from the beds by a compressor 118 through a line 119 and respective valved lines 120, 121 and 220. The compressor 118 is a pump capable of drawing a soft vacuum and at the same time compressing the delivered product gas to a required superatmospheric pressure. Regeneration of the beds is provided by a vacuum pump 122 connected to the beds by a line 123 and respective valved lines 124, 125 and 214. The beds can be backfilled with product quality gas through a line 126 and respective valved lines 127, 128, and 227. Pressure controllers P1, P2, and P3 are provided to close respective lines 127, 128 and 227 when the desired backfill pressure in the associated bed has been reached. Second cut gas can be fed to the beds through respective valved lines 151, 152 and 150.

Figure 2:
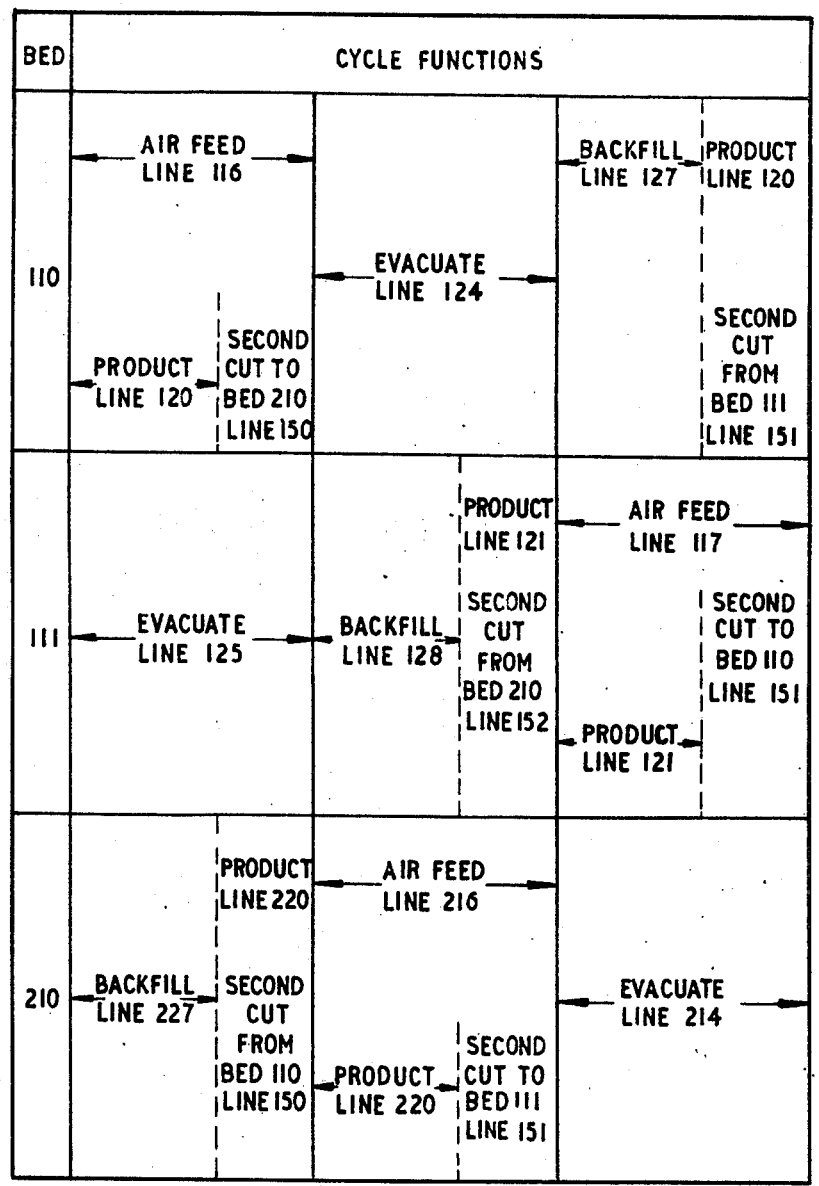
FIG. 2 is a diagram illustrating the operating sequence for the adsorbent beds of the plant of FIG. 1.

The beds are operated on similar cycles, each comprising the successive steps of air admission, vacuum regeneration, backfilling, and second cut gas admission, the cycles being sequenced to be out of phase by 120° with one another so that a substantially continuous product stream can be withdrawn from the plant. The timing of the cycles is illustrated by FIG. 2. It is observed that the time taken by the air admission step of each cycle is the same as that taken by the vacuum regeneration step and the same as that available for the sum of the backfilling and second cut gas admission steps. In this connection the timing diagram indicates a backfilling step for each cycle which occupies the whole of the time available for that step—i.e. when the plant is operating at the lowest bed temperature at which it is 'self-regulating'. In practice, however, whenever the bed temperature is higher than this value the actual time taken to backfill will be less and there will be a short rest period between the end of the backfilling step and the commencement of the second cut admission step for each cycle.

Considering an operating cycle for bed 110, at the commencement of the air admission step valved lines 116 and 120 are open and air is drawn into, and the oxygen rich product gas withdrawn from, the bed by pump 118. After a predetermined time, when the oxygen content in the gas issuing from the bed is about to fall below the desired product quality but is still enriched in comparison with the air feedstock, valved line 120 closes and valved line 150 opens to pass second cut gas to bed 210, the product thereby obtained from the latter bed being withdrawn through line 220 by the pump 118.

At the end of the air admission step for bed 110 valved lines 116 and 150 close and valved line 124 opens and the bed is regenerated for a set period of time by vacuum pump 122. As will be apparent, the vacuum reached in the bed at the end of the regeneration step will depend on the prevailing temperature.

Following regeneration valved line 124 closes and valved line 127 opens to backfill the bed. The backfill gas is tapped off from line 119, which at this time is passing the product withdrawn by pump 118 from bed 111, and flows to line 127 via line 126 which incorporates a fixed restriction R. The pressure in bed 110 during backfilling is sensed by a pressure controller P1 which acts to close line 127 and thereby terminate backfilling when a predetermined pressure has been reached. The actual time taken on the backfilling step is therefore largely dependent upon the adsorption capacity of the bed which in turn varies with the prevailing temperature.

After a predetermined lapse of time from the commencement of backfilling valved lines 120 and 151 open so that second gas cut from bed 111 is admitted to bed 110 and the oxygen rich product obtained thereby withdrawn by pump 118. After a predetermined time valved line 151 closes and valved line 116 opens to switch the gas supply to bed 110 from second cut to air, and the whole cycle of operation is repeated.

As indicated, the cycles for all the beds 110, 111 and 210 are similar, only the phasing being different, and so a description of the particular valve operations for beds 111 and 210 in addition to that for bed 110 is not deemed necessary.

We claim:

1. A pressure swing adsorption process for increasing the proportion of a selected gas in a gaseous mixture comprising repeating a cycle of operation which includes the successive steps of: contacting the mixture with a bed of adsorbent material which preferentially adsorbs one or more other components of the mixture; regenerating the bed by applying a vacuum thereto; and backfilling the bed; wherein the pressure in the bed during backfilling is sensed and backfilling is ceased when such pressure reaches a predetermined level whereby optimum backfill pressure is reached generally irrespective of temperature variations, and regeneration of the bed is controlled to occupy a substantially constant period of time.

2. A process according to claim 1 wherein the overall cycle of operation is controlled to occupy a substantially constant period of time.

3. A process according to claim 1 wherein there are a plurality of such beds each operating on a similar cycle but sequenced to be out of phase with one another whereby a substantially continuous supply of product gas can be obtained.

4. A process according to claim 3 wherein there are two such beds each operating on a cycle comprising an adsorption step, a vacuum regeneration step, and a backfilling step, the cycles for the beds being sequenced to be 180° out of phase with one another.

5. A process according to claim 4 wherein the time taken by the adsorption step substantially equals the time available for the sum of the regeneration and backfilling steps.

6. A process according to claim 3 wherein there are three such beds each operating on a cycle comprising an adsorption step, a vacuum regeneration step, and backfilling step, the cycles for the beds being sequenced to be 120° out of phase with one another.

7. A process according to claim 6 wherein the adsorption step for each bed is a compound step comprising a first part during which the bed is contacted with second cut gas and a second part during which the bed is contacted with said gaseous mixture.

8. A process according to claim 7 wherein the time taken by said second part of the adsorption step substantially equals the time taken by the vacuum regeneration step and the time available for the sum of the backfilling step and the first part of the adsorption step.

9. Pressure swing adsorption apparatus for increasing the proportion of a selected gas in a gaseous mixture, comprising: a bed of adsorbent material which preferentially adsorbs one or more other components of the mixture; means for contacting the mixture with said bed; a vacuum pump for regenerating the bed; means for passing product quality backfill gas into the bed from the outlet end thereof; means sensitive to the pressure in the bed during said passage of product quality backfill gas into the bed; and means for ceasing such backfill gas passage in response to a signal from said pressure sensitive means when such pressure reaches a predetermined level whereby optimum backfill pressure is reached irrespective of temperature variations.

* * * * *